(12) United States Patent
Fujimoto et al.

(10) Patent No.: US 9,901,987 B2
(45) Date of Patent: Feb. 27, 2018

(54) MACHINE TOOL

(71) Applicants: DMG MORI CO., LTD., Yamatokoriyama-shi (JP); ALPSTOOL CO., LTD., Hanishina-gun (JP)

(72) Inventors: Koji Fujimoto, Yamatokoriyama (JP); Tatsuhiko Kuriya, Yamatokoriyama (JP); Shuji Miyairi, Hanishina-gun (JP); Masayoshi Tanaka, Hanishina-gun (JP)

(73) Assignees: DMG MORI CO., LTD., Yamatokoriyama-shi (JP); ALPSTOOL CO., LTD., Hanishina-gun (JP)

( * ) Notice: Subject to any disclaimer, the term of this patent is extended or adjusted under 35 U.S.C. 154(b) by 194 days.

(21) Appl. No.: 15/017,073

(22) Filed: Feb. 5, 2016

(65) Prior Publication Data

US 2016/0229012 A1    Aug. 11, 2016

(30) Foreign Application Priority Data

Feb. 9, 2015 (JP) .................................. 2015-023508

(51) Int. Cl.
*B23B 29/24* (2006.01)
*B23B 29/32* (2006.01)
(Continued)

(52) U.S. Cl.
CPC ............ *B23B 29/24* (2013.01); *B23B 29/323* (2013.01); *B23B 31/008* (2013.01); *B23Q 5/10* (2013.01);
(Continued)

(58) Field of Classification Search
CPC ............... Y10T 29/519; Y10T 29/5152; Y10T 29/5154; Y10T 29/5155; Y10T 29/5167;
(Continued)

(56) References Cited

U.S. PATENT DOCUMENTS 4,237,595 A * 12/1980 Kitamura ............. B23B 31/265
29/26 A
4,413,938 A * 11/1983 Kuczenski ............ B23B 31/266
249/8
(Continued)

FOREIGN PATENT DOCUMENTS

| EP | 1992435 A1 * | 11/2008 | ............ B23B 29/20 |
|----|--------------|---------|------------------------|
| JP | 60-123243 | 7/1985 | |
| JP | 60-117001 U | 8/1985 | |
| JP | 6-238539 | 8/1994 | |

*Primary Examiner* — Erica E Cadugan
*Assistant Examiner* — Michael Vitale
(74) *Attorney, Agent, or Firm* — Oblon, McClelland, Maier & Neustadt, L.L.P.

(57) ABSTRACT

A machine tool includes: a lower tool rest on which a plurality of tools are mounted; a motor provided at the lower tool rest, for rotating a rotating tool when the rotating tool is mounted on the lower tool rest; and a tool holder attached to the lower tool rest, for detachably holding the tool. The tool holder has a clamping mechanism portion operating between a clamping state of clamping the tool and an unclamping state of unclamping the tool, as a result of transmission of motive power generated at the motor. With such a configuration, the clamping mechanism portion for automatically clamping and unclamping the tool held in the tool holder on the tool rest is provided with a simple configuration.

6 Claims, 9 Drawing Sheets

(51) Int. Cl.
*B23B 31/00* (2006.01)
*B23Q 5/10* (2006.01)
*B23Q 3/155* (2006.01)

(52) U.S. Cl.
CPC ...... *B23Q 3/15553* (2013.01); *B23Q 3/15573* (2013.01); *B23Q 2003/15586* (2013.01); *Y10T 29/519* (2015.01); *Y10T 29/5114* (2015.01); *Y10T 29/5155* (2015.01); *Y10T 29/5167* (2015.01); *Y10T 82/2506* (2015.01); *Y10T 82/2587* (2015.01); *Y10T 408/37* (2015.01)

(58) Field of Classification Search
CPC ............. Y10T 82/2506; Y10T 82/2508; Y10T 82/2587; Y10T 408/37; B23Q 2003/15586; B23B 29/24–29/34
USPC .......... 29/33 J, 35.5, 39, 40, 48.5 A; 82/120, 82/121, 159; 408/35
See application file for complete search history.

(56) References Cited

U.S. PATENT DOCUMENTS

| | | | | |
|---|---|---|---|---|
| 4,819,311 | A * | 4/1989 | Hashimoto | ........... B23B 31/263 29/40 |
| 7,971,328 | B2 * | 7/2011 | Sahm | ........................ B23Q 5/04 29/40 |
| 2012/0103150 | A1 * | 5/2012 | Fukuoka | ................ B23B 3/162 29/27 C |

\* cited by examiner

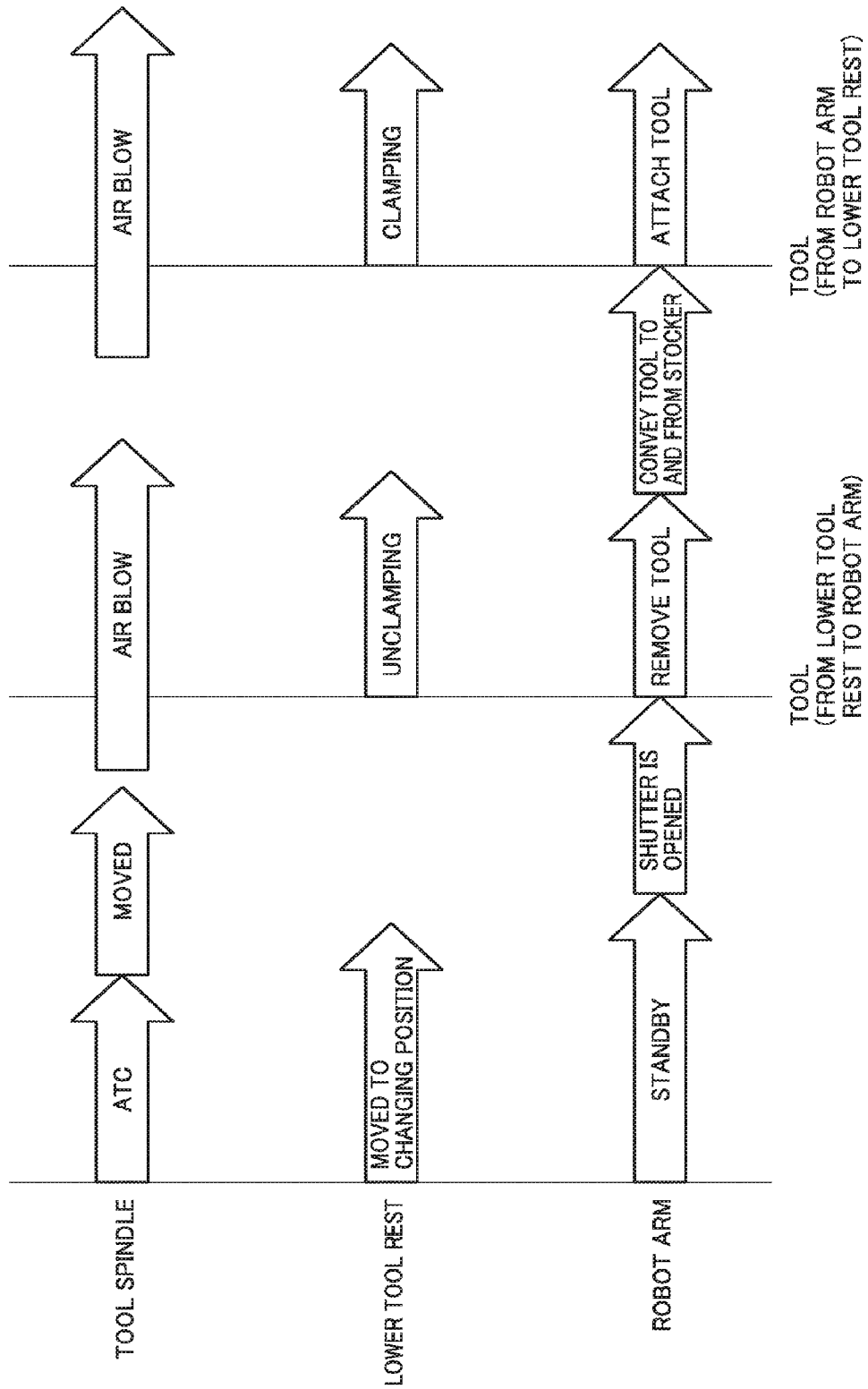

MACHINE TOOL

BACKGROUND OF THE INVENTION

Field of the Invention

The present invention generally relates to a machine tool, and more particularly to a machine tool including a tool rest incorporating a motor for driving a rotating tool.

Description of the Background Art

As to conventional machine tools, for example, Japanese Utility Model Laying-Open No. 60-117001 discloses a numerically controlled lathe equipped with an automatic tool changer (ATC), which aims at simplifying the operation of the ATC and shortening the time required to change a tool.

The numerically controlled lathe disclosed in Japanese Utility Model Laying-Open No. 60-117001 includes an automatic tool changer for automatically changing a tool between a turret on a tool rest and a tool magazine.

Further, Japanese Patent Laying-Open No. 60-123243 discloses a machine tool equipped with a tool changer, which aims at providing cleaning means that allows easy cleaning of each guide surface when automatically changing a tool block in a linear reciprocating motion, and that has a simple structure but still reliably operates, and also allows further swift cleaning.

The machine tool disclosed in Japanese Patent Laying-Open No. 60-123243 includes changing means for automatically changing a tool between a turret head on a tool rest and a tool magazine.

Furthermore, Japanese Patent Laying-Open No. 06-238539 discloses a tool changer which aims at attaching/detaching a tool unit to/from a tool holder attached to a turret, in parallel to the central axis line of the turret or at a right angle to this central axis line.

In the tool changer disclosed in Japanese Patent Laying-Open No. 06-238539, near the turret, an X-Z stage is provided for holding a drive box so as to be movable in directions at a right angle to and in parallel to the central axis line of the turret. A tool changing box having a tool hand for gripping the tool unit is swivelably provided to the drive box.

SUMMARY OF THE INVENTION

As disclosed in the above-described patent documents, machine tools including an automatic tool changer for automatically changing a tool held in a tool holder on a tool rest (turret) are known. In such a machine tool, it is desired that a clamping mechanism portion for automatically clamping and unclamping the tool when the tool is automatically changed is provided to the tool holder with a simple configuration.

Accordingly, an object of the present invention is to solve the aforementioned problem, and to provide a machine tool in which a clamping mechanism portion for automatically clamping and unclamping a tool held in a tool holder on a tool rest is provided with a simple configuration.

A machine tool according to the present invention includes: a tool rest on which a plurality of tools are mounted; a motor provided at the tool rest, for rotating a rotating tool when the rotating tool is mounted on the tool rest; and a tool holder attached to the tool rest, for detachably holding the tool. The tool holder has a clamping mechanism portion operating between a clamping state of clamping the tool and an unclamping state of unclamping the tool, as a result of transmission of motive power generated at the motor.

According to the present invention, there can be provided a machine tool in which a clamping mechanism portion for automatically clamping and unclamping a tool held in a tool holder on a tool rest is provided with a simple configuration.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a view showing an operation flow of the tool spindle and the lower tool rest when the tool mounted on the lower tool rest is automatically changed in the machine tool in FIG. 1.

DESCRIPTION OF THE PREFERRED EMBODIMENTS

Figure 1:
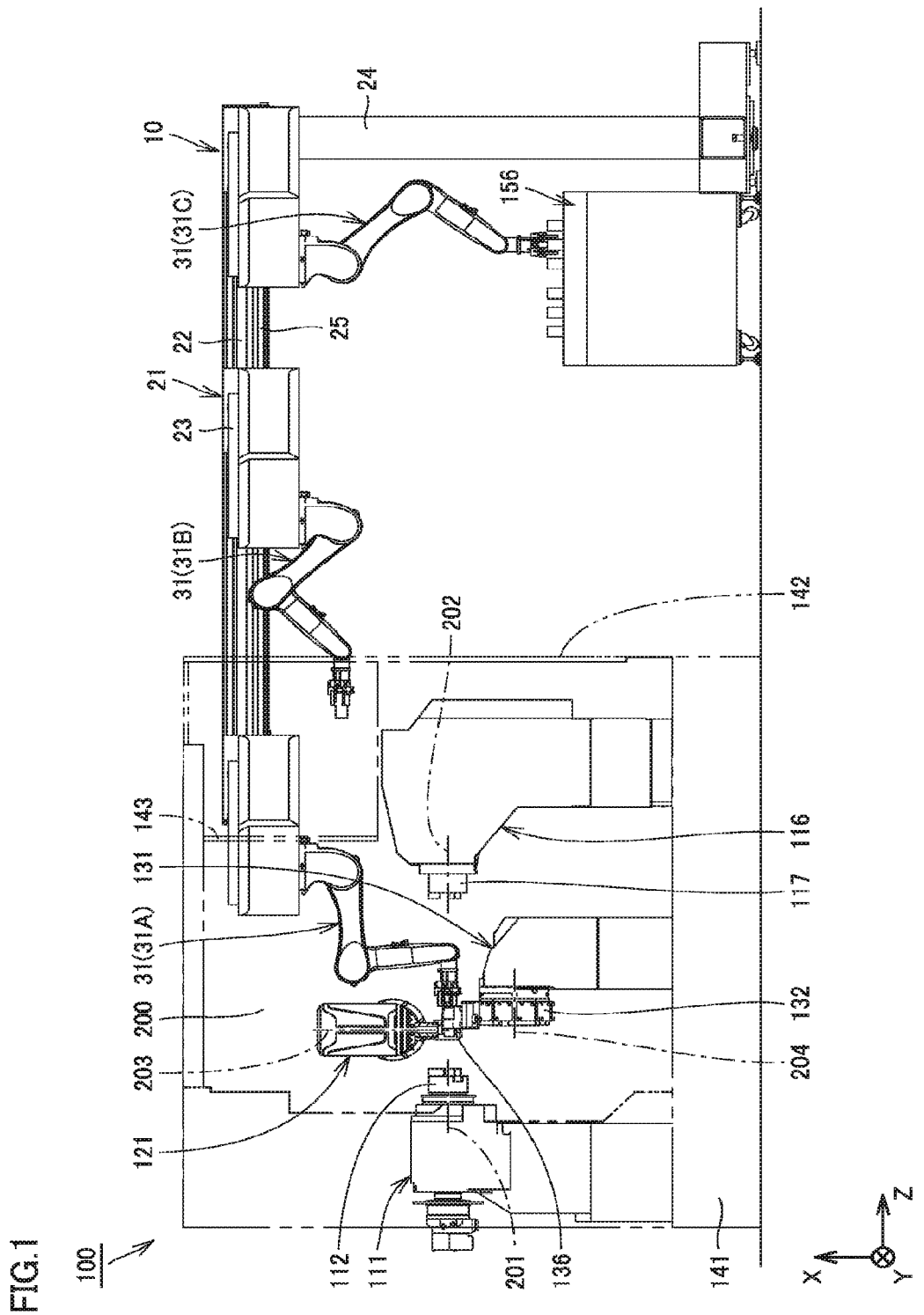
FIG. 1 is a front view showing a machine tool in an embodiment of the present invention.

An embodiment of the present invention will be described with reference to the drawings. In the drawings referred in the following, the same or corresponding components are designated by the same reference characters.

FIG. 1 is a front view showing a machine tool in an embodiment of the present invention. FIG. 1 includes a see-through view of a cover body exhibiting an external appearance of the machine tool, which shows the inside of the machine tool.

Referring to FIG. 1, a machine tool 100 is a composite process machine having a turning function using a fixed tool and a milling function using a rotating tool. First, the entire structure of machine tool 100 will be described. Machine tool 100 has a bed 141, a first headstock 111, a second headstock 116, a tool spindle 121, and a lower tool rest 131.

Bed 141 is a base member for supporting first headstock 111, second headstock 116, tool spindle 121, and lower tool rest 131, and is placed on an installation surface in a factory or the like.

First headstock 111 and second headstock 116 are provided to face each other in the Z-axis direction extending in the horizontal direction. First headstock 111 and second headstock 116 have a spindle 112 and a spindle 117, respectively, for rotating a workpiece during a turning process using a fixed tool. Spindle 112 is provided so as to be rotatable about a central axis 201 parallel to the Z-axis, while spindle 117 is provided so as to be rotatable about a central axis 202 parallel to the Z-axis. Spindle 112 and spindle 117 are each provided with a chuck mechanism for detachably holding the workpiece.

Tool spindle (an upper tool rest) 121 rotates a rotating tool during a milling process using the rotating tool. Tool spindle 121 is provided so as to be rotatable about a central axis 203 parallel to the X-axis extending in the vertical direction. Tool spindle 121 is provided with a clamping mechanism for detachably holding the rotating tool.

Tool spindle 121 is supported on bed 141 by a column and the like not shown. Tool spindle 121 is provided so as to be movable in the X-axis direction, in the Y-axis direction extending in the horizontal direction and orthogonal to the Z-axis direction, and in the Z-axis direction, by various types of feed mechanisms, guide mechanisms, servo motors, and the like provided to the column and the like. The machining position by the rotating tool mounted on tool spindle 121 is moved in a three-dimensional manner. Tool spindle 121 is provided so as to be also swivelable about a central axis parallel to the Y-axis.

Tool spindle 121 has an air supply portion (not shown) which can supply air. As a representative example, the air supply portion is provided as a mechanism for supplying the air to the rotating tool mounted on tool spindle 121 (center-through air blow).

On lower tool rest 131, a plurality of fixed tools for the turning process are mounted. Lower tool rest 131, which has a so-called turret type, is equipped with the plurality of fixed tools in a radial manner, and performs swivel indexing.

More specifically, lower tool rest 131 has a swivel portion 132. Swivel portion 132 is provided so as to be swivelable about a central axis 204 parallel to the Z-axis. At each of positions (10 positions in the present embodiment) disposed at intervals in the circumferential direction about central axis 204, a tool holder for holding a fixed tool is attached. Swivel portion 132 swivels about central axis 204, thereby causing the fixed tools held in the tool holders to move in the circumferential direction, so that the fixed tool used for the turning process is indexed.

Lower tool rest 131 is supported on bed 141 by a saddle and the like not shown. Lower tool rest 131 is provided so as to be movable in the X-axis direction and in the Z-axis direction, by various types of feed mechanisms, guide mechanisms, servo motors, and the like provided to the saddle and the like.

A motor (detailed structure thereof will be described later) for rotating the rotating tool is incorporated into lower tool rest 131. The rotating force from the motor is transmitted to the rotating tool held in the tool holder, so that the rotating tool can be used in lower tool rest 131.

Figure 2:
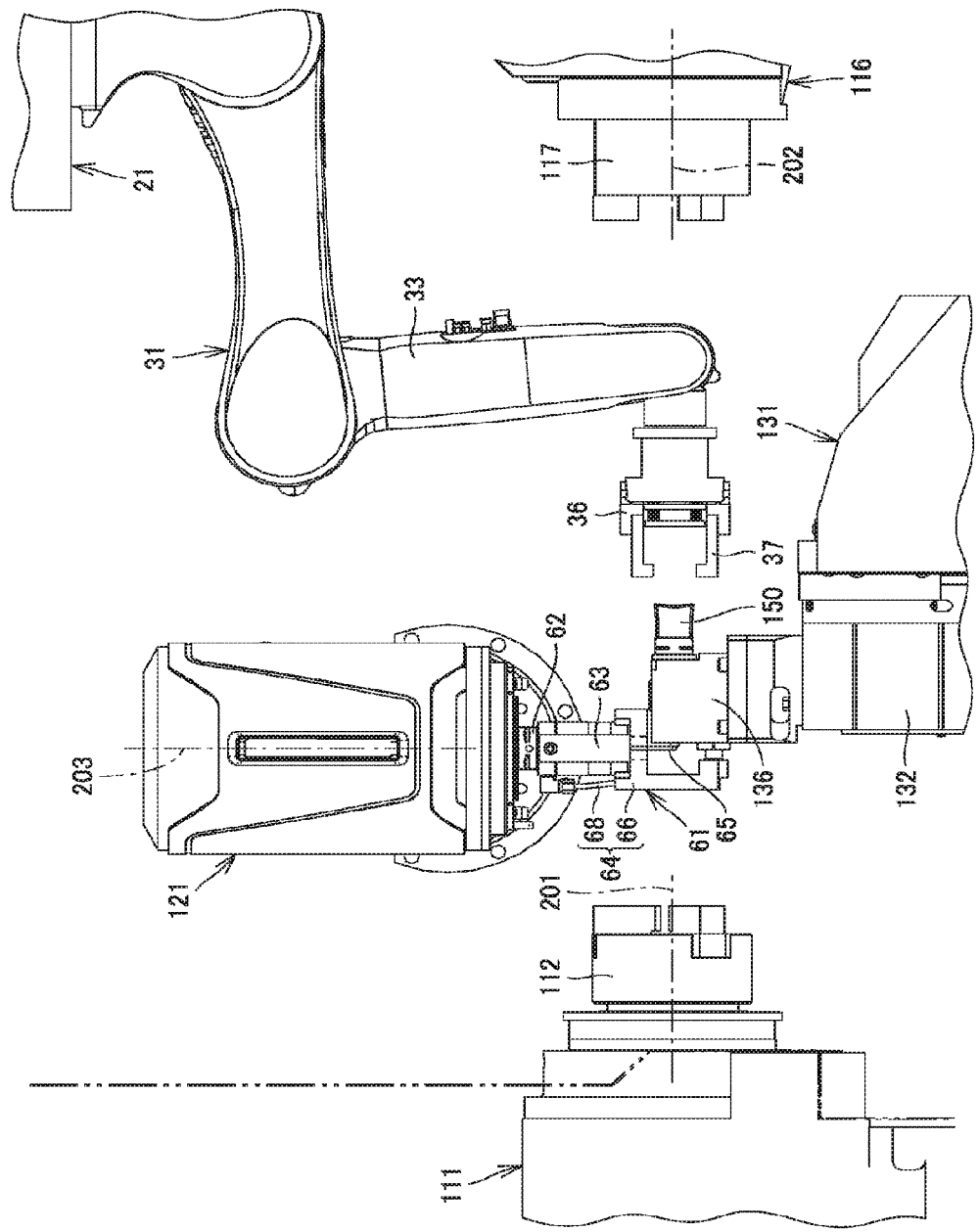
FIG. 2 is a side view showing the state within a machining area when a tool mounted on a lower tool rest is automatically changed in the machine tool in FIG. 1.

FIG. 2 is a side view showing the state within a machining area when a tool mounted on the lower tool rest is automatically changed in the machine tool in FIG. 1.

Referring to FIGS. 1 and 2, machine tool 100 has an automatic tool changer (ATC) 10 and a tool stocker 156. Automatic tool changer 10 automatically changes a tool mounted on lower tool rest 131. Tool stocker 156 is provided as a tool housing portion for housing replacement tools to be mounted on lower tool rest 131.

Machine tool 100 has a tool holder (for ATC) 136. Tool holder 136 is attached to lower tool rest 131 (swivel portion 132). Tool holder 136 incorporates a clamping mechanism portion for detachably holding a tool. Automatic tool changer 10 automatically replaces a tool held in tool holder 136 among a plurality of tools mounted on lower tool rest 131, with a tool housed in tool stocker 156. When a tool is mounted on lower tool rest 131, the tool is inserted into tool holder 136 from a direction parallel to the Z-axis.

Although not shown in FIG. 1, machine tool 100 has, around first headstock 111, an automatic tool changer for automatically changing the tool mounted on tool spindle 121, and a tool magazine for housing replacement tools to be mounted on tool spindle 121.

Machine tool 100 has a side cover 142. Side cover 142 is provided on a side opposite to first headstock 111 relative to second headstock 116. Side cover 142 provides separation between the inside and the outside of a machining area 200. Side cover 142 is provided with a shutter 143 that can be opened and closed. Tool stocker 156 is provided outside the machining area.

Automatic tool changer 10 has a robot arm 31 and a movement mechanism portion 21. Robot arm 31 is provided so as to be capable of gripping a tool. Movement mechanism portion 21 moves robot arm 31 between the inside and the outside of machining area 200. Movement mechanism portion 21 moves robot arm 31 in the range of a tool changing position 31A within the machining area, a standby position 31B outside the machining area, and a stocker position 31C outside the machining area.

Movement mechanism portion 21 has a base member 23, a linear guide 22, a rack and pinion 25, a servo motor (not shown), and a support pillar 24, as a mechanism for causing robot arm 31 to linearly reciprocate.

Base member 23 is made of a plate material, and has robot arm 31 and the servo motor attached thereto. Linear guide 22 and rack and pinion 25 are provided at a certain height from the installation surface for machine tool 100, by support pillar 24. Linear guide 22 is provided as a guide mechanism for guiding base member 23 in a direction parallel to the Z-axis. Rack and pinion 25 converts the rotation output from the servo motor into linear motion, thereby moving base member 23 in the Z-axis direction.

Robot arm 31 has an arm portion 33 and a gripping portion 36. Arm portion 33 is formed to extend from movement mechanism portion 21 toward gripping portion 36, in the shape of an arm. Arm portion 33 includes a plurality of movable portions coupled with each other via pivot axes. In the present embodiment, robot arm 31 is provided as a robot arm capable of controlling six axes (three pivot axes and three rotation axes) independently.

Gripping portion 36 is provided at a tip of arm portion 33. Gripping portion 36 has a claw portion 37. Claw portion 37 has a claw shape which can engage a tool. Gripping portion 36 detachably grips the tool using claw portion 37.

Although FIG. 2 shows gripping portion 36 of a single-arm type capable of gripping one tool at a time, a gripping portion of a double-arm type capable of simultaneously gripping two tools may be provided to arm portion 33.

Movement of robot arm 31 when the tool mounted on lower tool rest 131 is automatically changed will be described.

During machining of a workpiece, robot arm 31 stands by at standby position 31B without gripping a tool. When the machining of the workpiece is finished and changing of the tool mounted on lower tool rest 131 is required, shutter 143 is brought into an open state. Robot arm 31 moves into the machining area through an opening appearing in side cover 142, and reaches tool changing position 31A with arm portion 33 being swung. Robot arm 31 further moves in the Z-axis direction (leftward in the drawing), and thereby grips the tool held in tool holder 136.

Robot arm 31 gripping the tool moves from tool changing position 31A to stocker position 31C (conveyance of the tool). By appropriately controlling the six axes of arm portion 33, robot arm 31 returns the tool removed from lower tool rest 131 back to tool stocker 156, and newly grips a replacement tool prepared in tool stocker 156.

Robot arm 31 moves from stocker position 31C to tool changing position 31A (conveyance of the tool). By the same movement as that at the time of removing the tool described above, robot arm 31 mounts the replacement tool on tool holder 136. Robot arm 31 moves from tool changing position 31A to standby position 31B, and shutter 143 is brought into a closed state. Thereby, changing of the tool by automatic tool changer 10 is completed.

Figure 3:
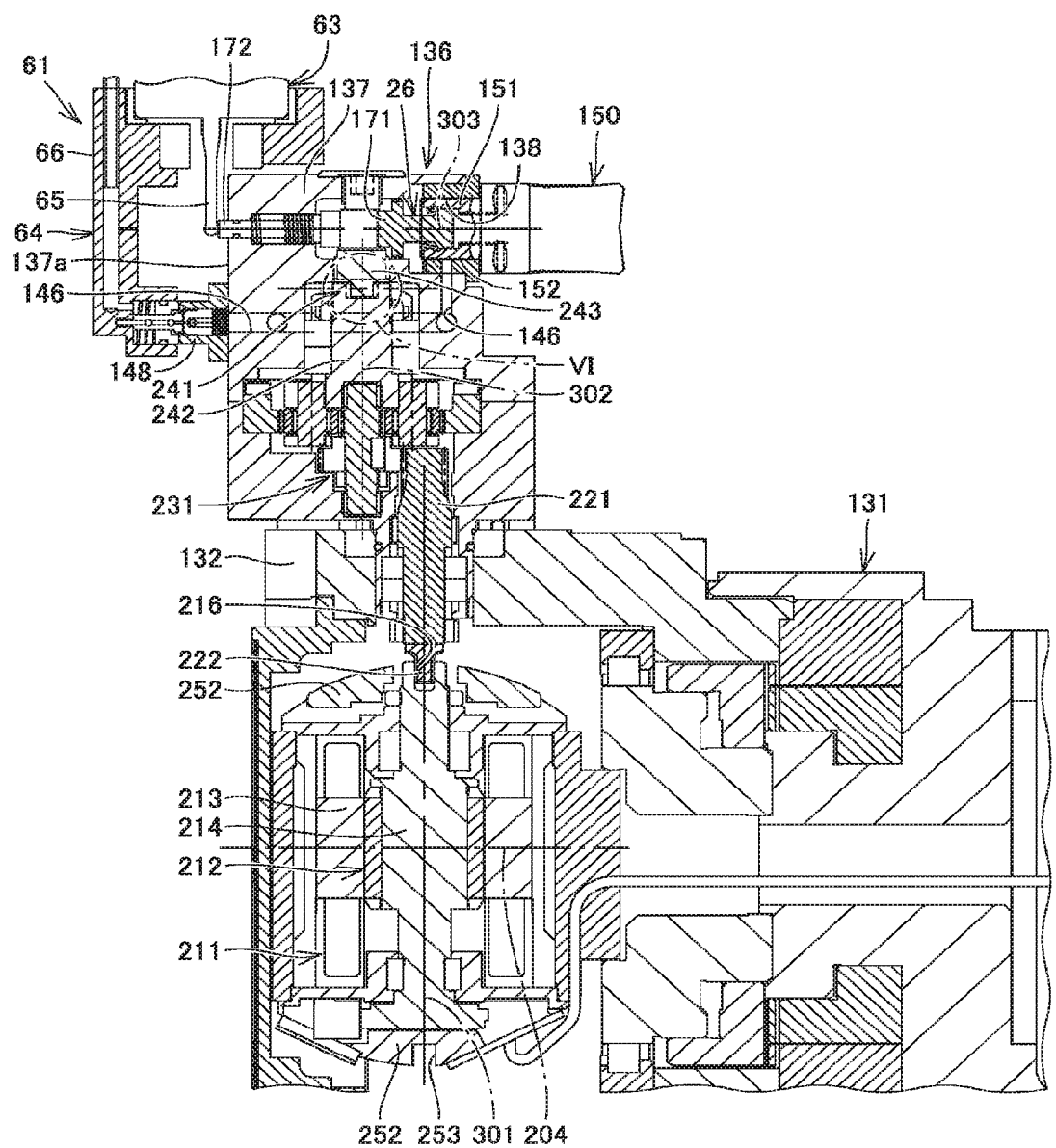
FIG. 3 is a cross-sectional view showing the lower tool rest and a tool holder in FIG. 2.

FIG. 3 is a cross-sectional view showing the lower tool rest and the tool holder in FIG. 2. Referring to FIG. 3, machine tool 100 has a motor 211 for rotating the rotating tool (not shown) when the rotating tool is mounted on lower tool rest 131.

Motor 211 is incorporated into lower tool rest 131. Motor 211 includes a rotor 212 and a stator 213. Rotor 212 has a rotor shaft 214. Rotor shaft 214 extends in the shape of a shaft, along an axis line direction of a central axis 301. Central axis 301 is orthogonal to the Z-axis direction and parallel to the X-axis direction. In association with driving of motor 211, rotor shaft 214 rotates about central axis 301.

Tool holder 136 has a block 137 and a clamping mechanism portion 26 for detachably holding the tool.

Block 137 is formed of a metal block. Block 137 has a side surface 137a. Side surface 137a is formed of a plane orthogonal to the Z-axis (an X-Y plane). Side surface 137a is provided, in the Z-axis direction, on a side facing first headstock 111, of first headstock 111 and second headstock 116.

Clamping mechanism portion 26 is incorporated into block 137. Clamping mechanism portion 26 operates between a clamping state of clamping the tool and an unclamping state of unclamping the tool, as a result of transmission of motive power generated at motor 211.

Clamping mechanism portion 26 has a clamp shaft 171. Clamp shaft 171 extends in the shape of a shaft, along an axis line direction of a central axis 303 parallel to the Z-axis. At a tip of clamp shaft 171 extending along the axis line direction of central axis 303, clamp shaft 171 has a shape which can engage a shank portion 151 of a tool 150. Clamp shaft 171 is provided so as to be slidable along the axis line direction of central axis 303.

Figure 4:
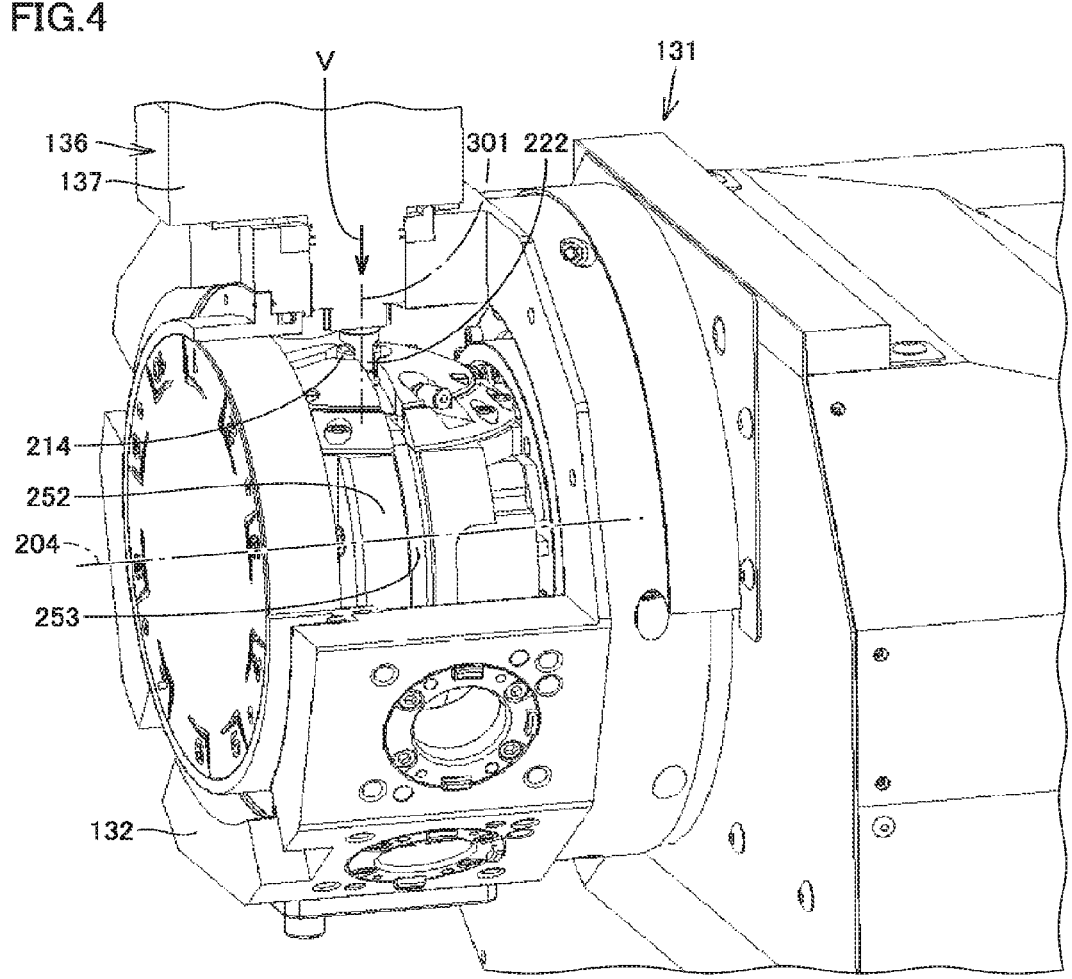
FIG. 4 is a perspective view showing an internal structure of the lower tool rest and the tool holder in FIG. 3.

Next, a mechanism for clamping the tool in tool holder 136 will be described. FIG. 4 is a perspective view showing an internal structure of the lower tool rest and the tool holder in FIG. 3. Referring to FIGS. 3 and 4, tool holder 136 further has a clutch shaft 221.

With tool 150 held in tool holder 136 in lower tool rest 131 being indexed as a machining tool, clutch shaft 221 is coupled to rotor shaft 214 and the rotation from motor 211 is input to clutch shaft 221. On the extension of rotor shaft 214, clutch shaft 221 extends in the shape of a shaft, along the axis line direction of central axis 301. At a tip of clutch shaft 221 extending in the shape of a shaft, clutch shaft 221 has a tip portion 222. Tip portion 222 is provided so as to protrude from block 137.

Figure 5:
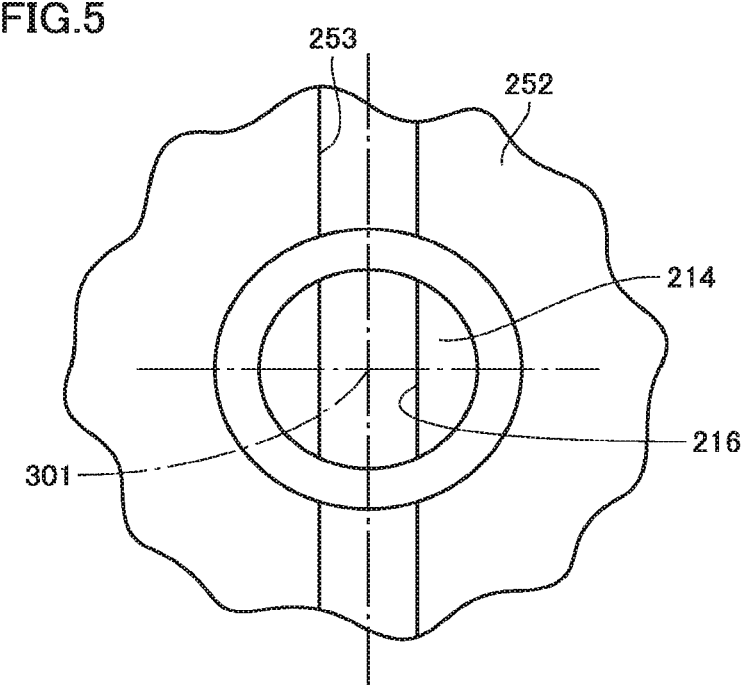
FIG. 5 is a top view of the lower tool rest seen from the direction indicated by an arrow V in FIG. 4.

FIG. 5 is a top view of the lower tool rest seen from the direction indicated by an arrow V in FIG. 4. Referring to FIGS. 3 to 5, lower tool rest 131 has a ring member 252. Ring member 252 has a shape of a ring about central axis 204. Ring member 252 has such a shape that a plurality of combined components as a whole are provided around central axis 204 in the shape of a ring.

Rotor shaft 214 is provided to pass through ring member 252 and face clutch shaft 221 of tool holder 136 at a tip of rotor shaft 214 extending in the shape of a shaft, along the axis line direction of central axis 301. The tip portion of rotor shaft 214 is provided with an engagement groove 216. Engagement groove 216 has a shape of a groove recessed from an end face of the tip portion of rotor shaft 214 and extending in one direction. Clutch shaft 221 (tip portion 222 thereof) engages engagement groove 216, so that clutch shaft 221 and rotor shaft 214 are coupled with each other.

Ring member 252 is provided with an annular groove 253. Annular groove 253 has a shape of a groove recessed from an outer circumferential surface of ring member 252 and annularly provided around central axis 204. A phase position of rotor shaft 214 is aligned such that the direction of extension of engagement groove 216 matches with the circumferential direction about central axis 204, and thereby engagement groove 216 is continuous to annular groove 253. On this occasion, clutch shaft 221 (tip portion 222 thereof) can move between engagement groove 216 and annular groove 253, and swivel indexing of the plurality of tools mounted on lower tool rest 131 can be performed.

Referring to FIG. 3, tool holder 136 further has a decelerating mechanism portion 231 and a motion converting mechanism portion 241.

Decelerating mechanism portion 231 is incorporated into block 137. Decelerating mechanism portion 231 is provided between clutch shaft 221 and motion converting mechanism portion 241 on a motive power transmission path from motor 211 to clamping mechanism portion 26. Decelerating mechanism portion 231 decelerates the rotation input to clutch shaft 221, and outputs the decelerated rotation to motion converting mechanism portion 241. Decelerating mechanism portion 231 is formed by combining a plurality of gears.

In the present embodiment, decelerating mechanism portion 231 is formed by a planetary gear mechanism. As one example, a reduction ratio R (the number of input rotations/the number of output rotations) of decelerating mechanism portion 231 is 10.

Motion converting mechanism portion 241 is incorporated into block 137. Motion converting mechanism portion 241 is provided between decelerating mechanism portion 231 and clamping mechanism portion 26 on the motive power transmission path from motor 211 to clamping mechanism portion 26. Motion converting mechanism portion 241 converts the rotation decelerated by decelerating mechanism portion 231 into linear motion, and transmits the linear motion to clamping mechanism portion 26.

Figure 6:
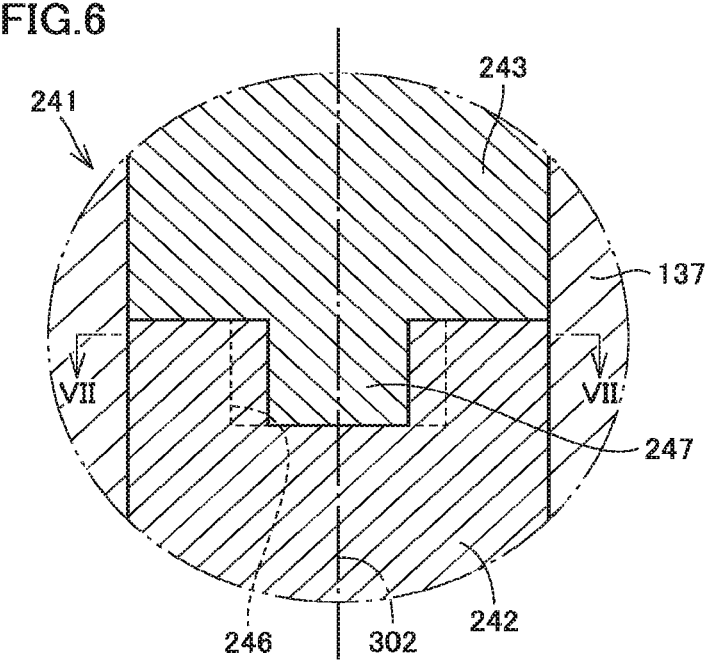
FIG. 6 is an enlarged cross-sectional view of a region surrounded by a two-dot chain line VI in FIG. 3.
Figure 7:
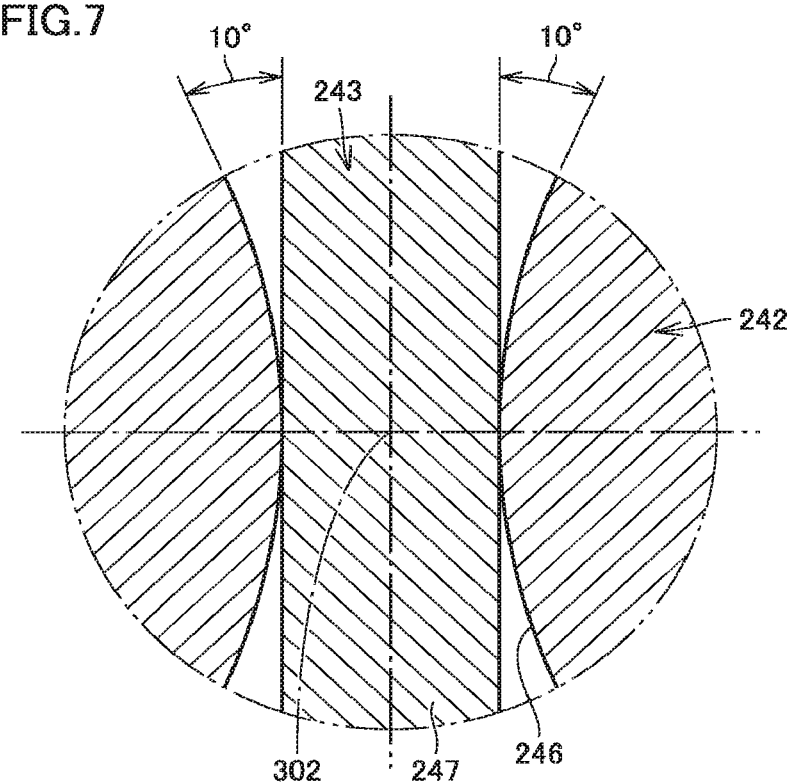
FIG. 7 is a cross-sectional view showing the tool holder taken along line VII-VII in FIG. 6.

FIG. 6 is an enlarged cross-sectional view showing a region surrounded by a two-dot chain line VI in FIG. 3. FIG. 7 is a cross-sectional view showing the tool holder taken along line VII-VII in FIG. 6.

Referring to FIGS. 3, 6 and 7, in the present embodiment, motion converting mechanism portion 241 converts the rotation motion into the linear motion by using a cam mechanism.

More specific description will be given. Decelerating mechanism portion 231 has an output shaft 242. Output shaft 242 extends in the shape of a shaft, along an axis line direction of a central axis 302 orthogonal to central axis 303 and parallel to central axis 301. Output shaft 242 outputs the rotation decelerated by decelerating mechanism portion 231 to motion converting mechanism portion 241. A tip portion of output shaft 242 is provided with a groove portion 246. Groove portion 246 has a shape of a groove recessed from an end face of the tip portion of output shaft 242.

Motion converting mechanism portion 241 has a rotation input member 243. Rotation input member 243 is provided on the extension of output shaft 242 extending along the axis line direction of central axis 302. Rotation input member 243 has a key portion 247 as a constituent element. Key portion 247 has a key shape having a substantially rectangular cross section. Key portion 247 engages groove portion 246, so that output shaft 242 and rotation input member 243 are coupled with each other. Rotation input member 243 has a shape of a cam that converts the rotation motion about central axis 302 input from output shaft 242 into the linear motion in the axis line direction of central axis 303, and transmits the linear motion to clamp shaft 171.

As a result of transmission of the rotation from motor 211, output shaft 242 performs normal rotation and counter rotation about central axis 302. When output shaft 242 performs normal rotation about central axis 302, clamp shaft 171 slides and moves leftward in the drawing. On this occasion, clamp shaft 171 engages shank portion 151 of tool 150 and draws in tool 150, and thereby tool 150 is clamped. On the other hand, when output shaft 242 performs counter rotation about central axis 302, clamp shaft 171 slides and moves rightward in the drawing. On this occasion, engagement between clamp shaft 171 and shank portion 151 of tool 150 is released, and thereby tool 150 is unclamped.

As described above, in the present embodiment, clamping mechanism portion 26 is operated by using motor 211 for rotating the rotating tool mounted on lower tool rest 131. In other words, motor 211 incorporated into lower tool rest 131 is used both as a motor for driving the rotating tool mounted on lower tool rest 131 and as a motor for driving clamping mechanism portion 26.

In the present embodiment, description has been given to the case in which motor 211 is incorporated into lower tool rest 131. However, motor 211 may be provided external to lower tool rest 131. In this case, motor 211 is coupled to the rotation shaft (corresponding to rotor shaft 214) incorporated into lower tool rest 131, via an appropriate motive power transmission mechanism.

Referring to FIGS. 3 to 7, in the present embodiment, motion converting mechanism portion 241 operates clamping mechanism portion 26 when the rotation input from motor 211 to clutch shaft 221 is equal to or greater than 180°.

With such a configuration, before performing swivel indexing of the tools mounted on lower tool rest 131, rotor shaft 214 is rotated in a range where clamping mechanism portion 26 is not operated when the rotation is input from motor 211 to clutch shaft 221 (i.e., a range of an angle smaller than)180°, and thereby, with the clamping state of tool 150 by clamping mechanism portion 26 being maintained, the phase position of rotor shaft 214 around central axis 301 can be aligned such that engagement groove 216 is circumferentially continuous to annular groove 253. As a result, tip portion 222 of clutch shaft 221 can move between engagement groove 216 and annular groove 253, and swivel indexing of the tools mounted on lower tool rest 131 can be performed.

Figure 8:
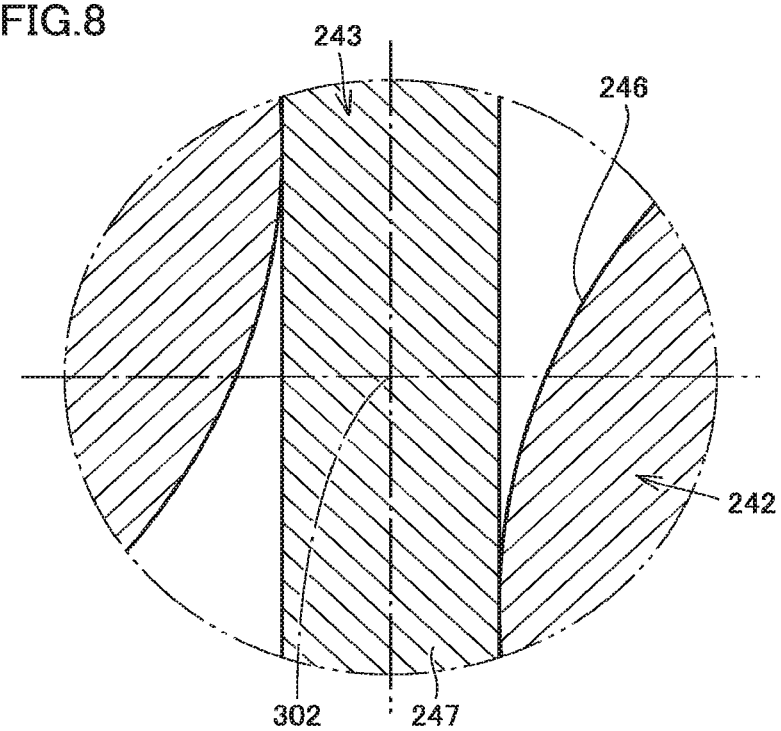
FIG. 8 is a cross-sectional view showing a position of a key portion in a clamping state.
Figure 9:
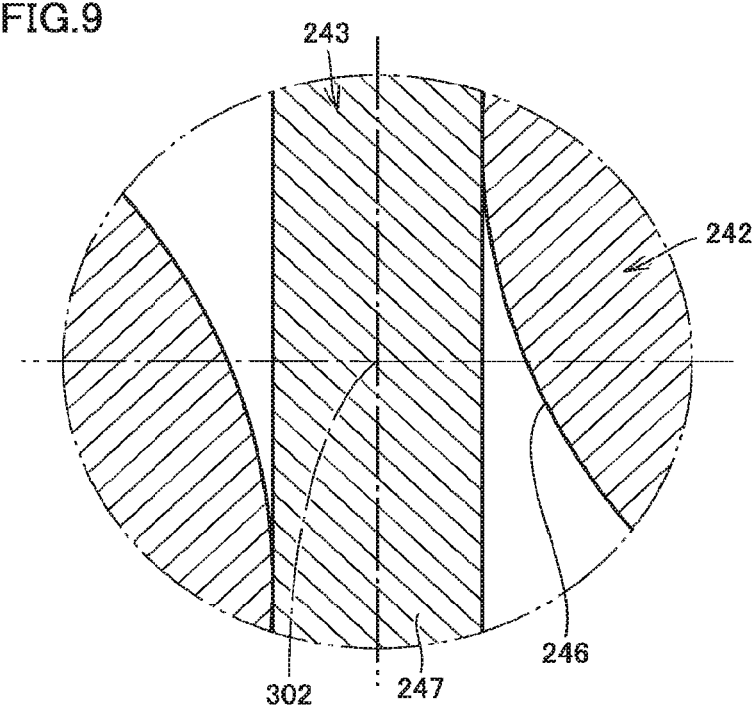
FIG. 9 is a cross-sectional view showing a position of the key portion at the start of unclamping.

FIG. 8 is a cross-sectional view showing a position of the key portion in the clamping state. FIG. 9 is a cross-sectional view showing a position of the key portion at the start of unclamping. Referring to FIGS. 7 to 9, a width of groove portion 246 formed in output shaft 242 becomes greater with increasing distance from central axis 302 in the radial direction, while a width of key portion 247 of rotation input member 243 is constant. As a result, between key portion 247 and a groove wall of groove portion 246, a gap is provided in the rotation direction of output shaft 242.

Since the gap is provided between key portion 247 and the groove wall of groove portion 246, the rotation is not transmitted from output shaft 242 to rotation input member 243 during a period from the clamping state shown in FIG. 8 to the start of unclamping shown in FIG. 9, regardless of input of the rotation from motor 211 to clutch shaft 221. Namely, during the period from the clamping state to the start of unclamping, a rotation angle of output shaft 242 that does not cause clamping mechanism portion 26 to operate is formed.

On this occasion, when a size of the gap between key portion 247 and one or the other groove wall of groove portion 246 shown in FIG. 7 is set at 10° with respect to central axis 302 as the center, a rotation angle θ of output shaft 242 in the range where the rotation input from motor 211 to clutch shaft 221 does not cause clamping mechanism portion 26 to operate is 20°.

Assuming that R (the number of input rotations/the number of output rotations) represents the reduction ratio of decelerating mechanism portion 231, a relationship of θ>180°×1/R is satisfied, and thus, it is possible to achieve the configuration in which clamping mechanism portion 26 is operated when the rotation input from motor 211 to clutch shaft 221 is equal to or greater than 180°. In the present embodiment, θ is set at 20°(θ=20°>180°×1/10) under the assumption that reduction ratio R of decelerating mechanism portion 231 is 10.

The present embodiment is configured such that motion converting mechanism portion 241 operates clamping mechanism portion 26 when the rotation input from motor 211 to clutch shaft 221 is equal to or greater than 180°. However, the rotation input from motor 211 to clutch shaft 221 when clamping mechanism portion 26 is operated may be equal to or greater than 180°×n (n is an integer equal to or greater than 2). For example, when only one reference position of a rotation angle sensor of motor 211 is provided in one circle, n may be 2. In this case, when rotation angle θ of output shaft 242 in the range where the rotation input from motor 211 to clutch shaft 221 does not cause clamping mechanism portion 26 to operate is set at a value greater than 36° in accordance with the aforementioned relation equation, the gap between key portion 247 and the groove wall of groove portion 246 may become too large, and key portion 247 and groove portion 246 may be broken. Examples of a method for solving the aforementioned problem include a method for setting reduction ratio R of decelerating mechanism portion 231 at a value greater than 18, assuming that θ is 20°.

In addition, by configuring groove portion 246 such that the facing groove walls are parallel to each other, and configuring key portion 247 to have a key shape having a barrel-shaped cross section, the gap in the rotation direction of output shaft 242 may be provided between key portion 247 and the groove wall of groove portion 246. Further, the similar gap structure may be provided at engagement groove 216 and tip portion 222 of clutch shaft 221 in FIGS. 3 and 4, or the range in which clamping mechanism portion 26 is not operated may be formed by using a play between the gears in motion converting mechanism portion 241.

In the present embodiment, description has been given to the case in which the tool automatically changed in lower tool rest 131 is the fixed tool for turning. However, the rotating tool can also be automatically changed. In this case, tool holder 136 may have a motion converting mechanism portion converting the rotation of motor 211 into the linear motion and transmitting the linear motion to clamping mechanism portion 26 in order to clamp and unclamp the rotating tool, a rotation take-out mechanism portion transmitting the rotation of motor 211 to the rotating tool in order to rotate the rotating tool, and a switching mechanism portion switching the transmission of the motive power from motor 211 between the motion converting mechanism portion and the rotation take-out mechanism portion.

Machine tool 100 has a control portion (not shown) controlling the rotation of motor 211. The control portion controls the rotation of motor 211 such that an upper limit output of motor 211 when clamping mechanism portion 26 is operated is smaller than an upper limit output of motor 211 when the rotating tool is rotated.

With such a configuration, it is possible to prevent excessive torque from acting on the gears forming decelerating mechanism portion 231 when clamping mechanism portion 26 is operated.

Next, an air blow structure and a structure for confirming whether the tool is clamped or unclamped, when the tool mounted on lower tool rest 131 is automatically changed will be described.

Referring to FIG. 3, block 137 has a tapered surface 138. Tapered surface 138 is provided as a restraining surface for restraining tool 150. Tapered surface 138 is provided so as to surround clamp shaft 171 from the outer circumference thereof. Tapered surface 138 has a tapered shape corresponding to a tapered surface 152 of shank portion 151. With tool 150 being held by tool holder 136, tapered surface 138 is in surface contact with tapered surface 152 of shank portion 151.

In block 137, an air passage 146 through which the air can flow is formed. One end portion of air passage 146 is opened in side surface 137a, and the other end portion of air passage 146 is opened in tapered surface 138.

A plug 148 is attached to block 137. Plug 148 is attached to an opening of air passage 146 in side surface 137a. Plug 148 has a shape to which a tool tip block 66 of a special tool 61 described later is connectable. By connecting tool tip block 66 to plug 148, air passage 146 on the block 137 side establishes communication with an air passage on the special tool 61 side.

Tool holder 136 further has a dog 172. Dog 172 is provided as an operating element operating in association with clamping of tool 150 in tool holder 136.

Dog 172 is connected to clamp shaft 171. Dog 172 has a shaft shape extending along the axis line direction of central axis 303. Dog 172 is provided so as to protrude from side surface 137a of block 137. When tool 150 is clamped, dog 172 slides and moves leftward in the drawing together with clamp shaft 171. Thereby, a protrusion length of dog 172 from side surface 137a increases.

Figure 10:
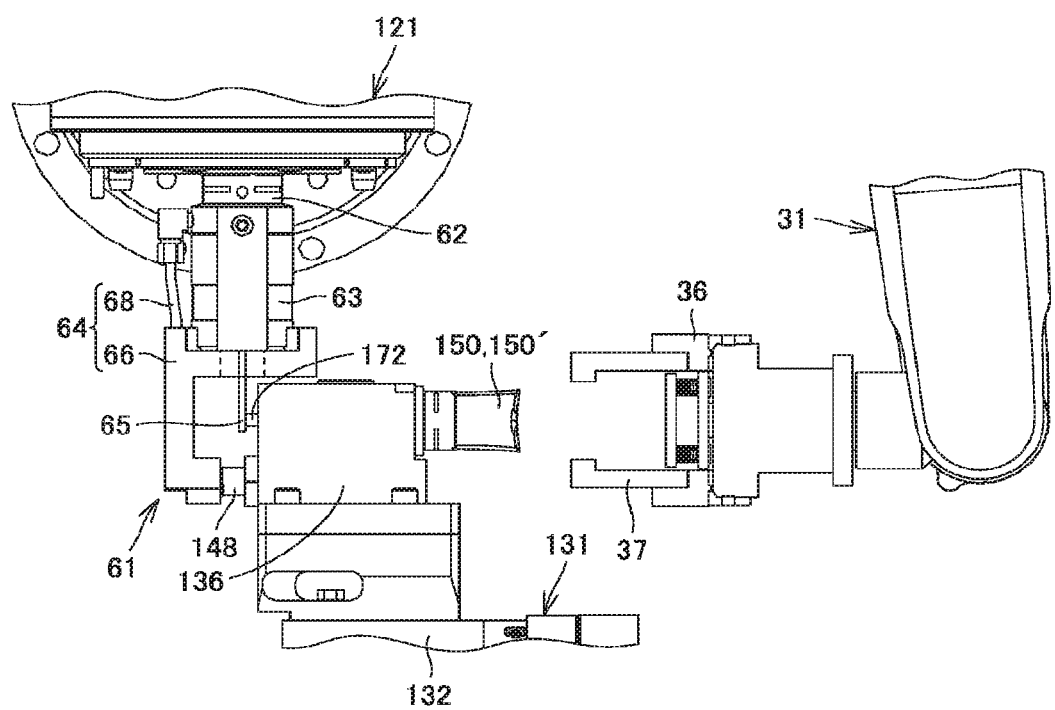
FIG. 10 is a side view showing movement of a tool spindle and a robot arm when the tool mounted on the lower tool rest is automatically changed in the machine tool in FIG. 1.
Figure 11:
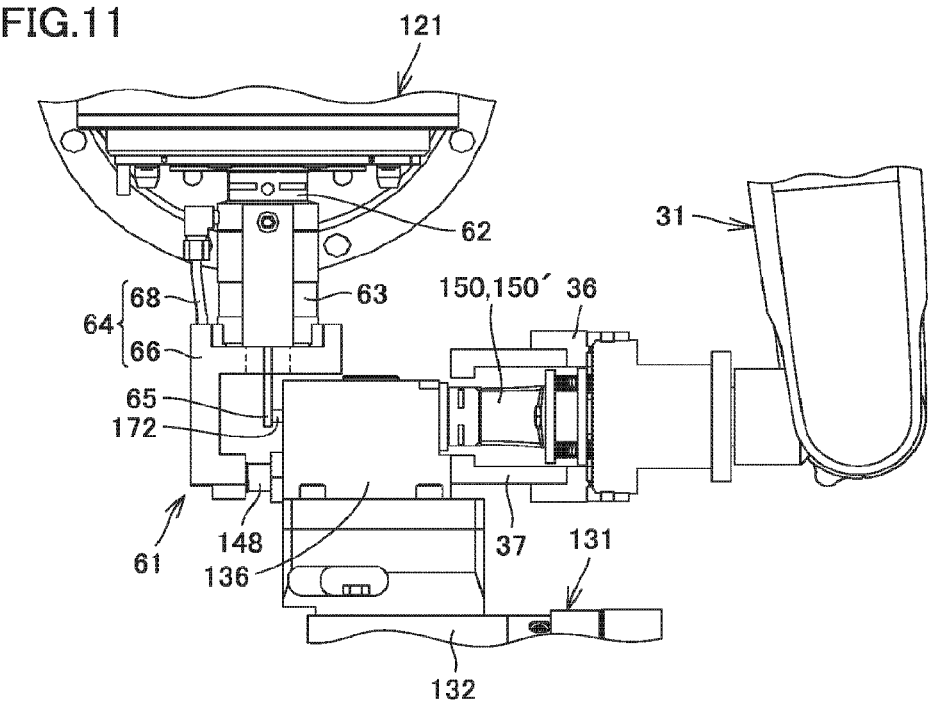
FIG. 11 is a side view showing movement of the tool spindle and the robot arm when the tool mounted on the lower tool rest is automatically changed in the machine tool in FIG. 1.
Figure 12:
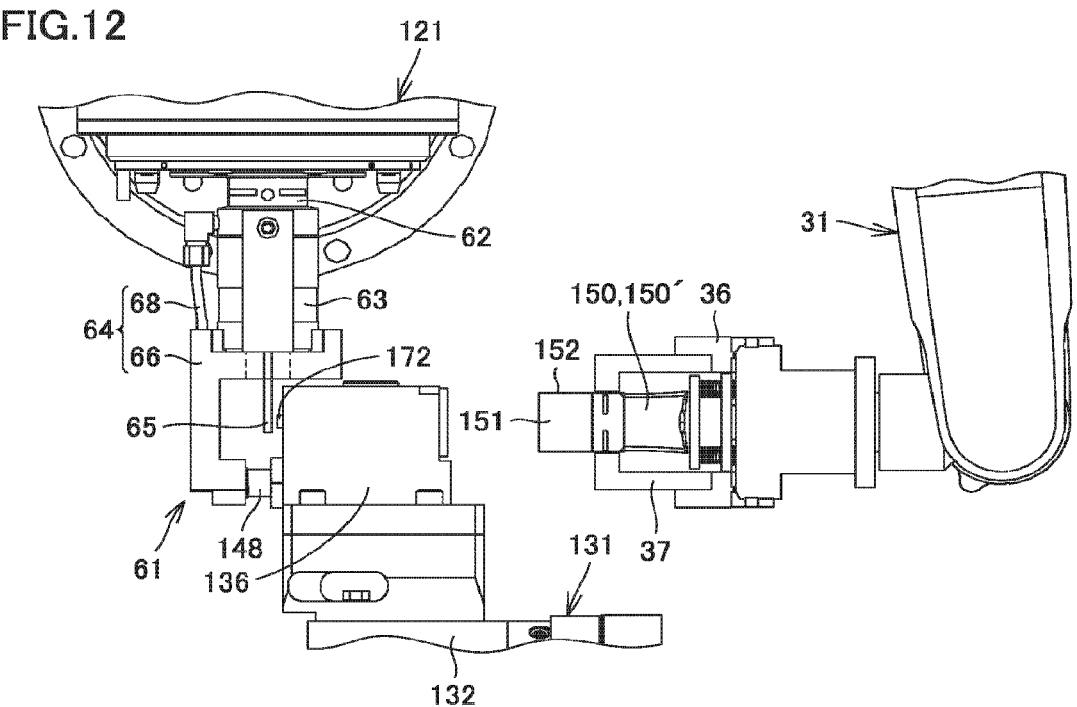
FIG. 12 is a side view showing movement of the tool spindle and the robot arm when the tool mounted on the lower tool rest is automatically changed in the machine tool in FIG. 1.

FIGS. 10 to 12 each are a side view showing movement of the tool spindle and the robot arm when the tool mounted on the lower tool rest is automatically changed in the machine tool in FIG. 1.

Referring to FIGS. 10 to 12, machine tool 100 further has special tool 61. Special tool 61 is mounted on tool spindle 121 when tool 150 mounted on lower tool rest 131 is automatically changed by automatic tool changer 10.

Special tool 61 includes a shank portion 62, an air passage forming portion 64, and a sensor portion 63. Shank portion 62 is clamped by a clamping mechanism (not shown) provided to tool spindle 121. Air passage forming portion 64 and sensor portion 63 are provided to shank portion 62.

Air passage forming portion 64 forms an air passage through which the air can flow. Air passage forming portion 64 includes a pipe 68 and tool tip block 66. Pipe 68 is provided to guide the air introduced from the air supply portion (not shown) of tool spindle 121 into shank portion 62, to tool tip block 66.

Tool tip block 66 is formed of a metal block. Tool tip block 66 has a substantially L shape when viewed from the Y-axis direction. Tool tip block 66 is attached to a tip of special tool 61. In tool tip block 66, the air passage for guiding the air introduced from pipe 68 to air passage 146 (plug 148) of tool holder 136 is formed.

Sensor portion 63 detects operation of dog 172 when tool 150 mounted on lower tool rest 131 is changed. Sensor portion 63 has a probe 65. Probe 65 is provided as a sensing pin for dog 172 which is an object to be sensed. Probe 65 is provided to extend vertically downward. Sensor portion 63 is a wireless sensor which wirelessly transmits a result detected by probe 65 (contact/non-contact with dog 172) to a receiver.

FIG. 13 is a view showing an operation flow of the tool spindle and the lower tool rest when the tool mounted on the lower tool rest is automatically changed in the machine tool in FIG. 1.

In machine tool 100 in the present embodiment, when the tool mounted on lower tool rest 131 is automatically changed, air blow to tapered surface 138 in tool holder 136 is performed and whether the tool is clamped or unclamped is confirmed, by coupling special tool 61 mounted on tool spindle 121 to tool holder 136. Hereinafter, an operation flow of tool spindle 121 and lower tool rest 131 in association with this auto tool changing will be described.

Referring to FIGS. 1, 10, and 13, robot arm 31 is moved from standby position 31B to tool changing position 31A. In this period, lower tool rest 131 is moved to a predetermined tool changing position. Auto tool changing of tool spindle 121 is performed by the automatic tool changer (not shown), to mount special tool 61 on tool spindle 121. Tool spindle 121 is moved while performing air supply from the air supply portion (not shown) of tool spindle 121 to special tool 61, to couple special tool 61 to tool holder 136 on lower tool rest 131 located at the tool changing position.

On this occasion, special tool 61 is positioned on a side opposite to gripping portion 36 with tool holder 136 sandwiched therebetween. Specifically, special tool 61 is positioned on the first headstock 111 side, and gripping portion 36 is positioned on the second headstock 116 side, with tool holder 136 sandwiched therebetween. Such a configuration can easily avoid interference between gripping portion 36 which moves towards tool 150 held in tool holder 136 and special tool 61 which moves towards tool holder 136, within the machining area.

When special tool 61 is coupled to tool holder 136, tool tip block 66 is connected to plug 148. The air from the air supply portion (not shown) of tool spindle 121 is supplied to air passage 146 of tool holder 136, through special tool 61 (shank portion 62, pipe 68, and tool tip block 66). Further, probe 65 provided to special tool 61 is positioned in contact with dog 172.

Referring to FIGS. 11 and 13, robot arm 31 is moved leftward in FIG. 11, to grip tool 150 held in tool holder 136 by gripping portion 36. Tool holder 136 unclamps tool 150 at timing when tool 150 is gripped by robot arm 31.

On this occasion, dog 172 slides and moves rightward in the drawing, and thus the protrusion length of dog 172 from side surface 137a decreases. Thereby, probe 65 loses contact with dog 172, and unclamping of tool 150 is confirmed in sensor portion 63.

Referring to FIGS. 12 and 13, robot arm 31 is moved rightward in FIG. 12, to remove tool 150 from tool holder 136.

On this occasion, an opening of air passage 146 in tapered surface 138 is released, and the air flowing from tool spindle 121 into air passage 146 is supplied to a gap between tapered surface 138 and tapered surface 152 of shank portion 151 of tool 150. This prevents foreign substances such as chips and a coolant from remaining on tapered surface 138. Thereafter, the air supply from the air supply portion (not shown) of tool spindle 121 to special tool 61 is suspended.

Referring to FIGS. 1, 12, and 13, robot arm 31 gripping a replacement tool 150' is moved from stocker position 31C to tool changing position 31A. The air supply from the air supply portion (not shown) of tool spindle 121 to special tool 61 is resumed.

Referring to FIGS. 11 and 13, robot arm 31 is moved leftward in FIG. 11, to insert replacement tool 150' into tool holder 136. The air flowing through air passage 146 is supplied to a gap between tapered surface 138 and tapered surface 152 of shank portion 151 of tool 150', in the same way as that at the time of removing tool 150.

Tool holder 136 clamps tool 150' at timing when tool 150' is inserted by robot arm 31. On this occasion, dog 172 slides and moves leftward in the drawing, and thus the protrusion length of dog 172 from side surface 137a increases. Thereby, probe 65 comes into contact with dog 172, and clamping of tool 150' is confirmed in sensor portion 63.

Referring to FIGS. 10 and 13, robot arm 31 is moved rightward in FIG. 10, to move gripping portion 36 away from tool 150'.

The structure of machine tool 100 in the embodiment of the present invention described above will be described in summary. Machine tool 100 in the present embodiment includes: lower tool rest 131 on which a plurality of tools are mounted; motor 211 provided at lower tool rest 131, for rotating the rotating tool when the rotating tool is mounted on lower tool rest 131; and tool holder 136 attached to lower tool rest 131, for detachably holding the tool. Tool holder 136 has clamping mechanism portion 26 operating between a clamping state of clamping the tool and an unclamping state of unclamping the tool, as a result of transmission of motive power generated at motor 211.

According to machine tool 100 in the embodiment of the present invention configured as described above, clamping mechanism portion 26 is operated by using motor 211 for rotating the rotating tool mounted on lower tool rest 131. As a result, clamping mechanism portion 26 for automatically clamping and unclamping the tool held in tool holder 136 on lower tool rest 131 can be provided with a simple configuration.

A machine tool according to the present invention includes: a tool rest on which a plurality of tools are mounted; a motor provided at the tool rest, for rotating a rotating tool when the rotating tool is mounted on the tool rest; and a tool holder attached to the tool rest, for detachably holding the tool. The tool holder has a clamping mechanism portion operating between a clamping state of clamping the tool and an unclamping state of unclamping the tool, as a result of transmission of motive power generated at the motor.

According to the machine tool configured as described above, the clamping mechanism portion for clamping and unclamping the tool on the tool holder is operated by using the motor for rotating the rotating tool. Therefore, the clamping mechanism portion can be provided with a simple configuration.

Preferably, the tool holder further has a clutch shaft to which rotation is input from the motor, a decelerating mechanism portion decelerating the rotation input to the clutch shaft, and a motion converting mechanism portion converting the rotation decelerated by the decelerating mechanism portion into linear motion and transmitting the linear motion to the clamping mechanism portion.

According to the machine tool configured as described above, the rotation from the motor is transmitted to the clamping mechanism portion through the clutch shaft, the decelerating mechanism portion and the motion converting mechanism portion, so that the clamping mechanism portion can be operated.

Preferably, the motor has a rotor shaft provided with an engagement groove which the clutch shaft engages, and outputting the rotation to the decelerating mechanism portion. The tool rest has a ring member provided with an annular groove extending circumferentially and being continuous to the engagement groove. The clutch shaft is provided so as to be movable between the engagement groove and the annular groove when swivel indexing of the plurality of tools mounted on the tool rest is performed. The motion converting mechanism portion operates the clamping mechanism portion when the rotation input from the motor to the clutch shaft is equal to or greater than 180°.

According to the machine tool configured as described above, the rotor shaft is rotated in the range where the clamping mechanism portion is not operated when the rotation is input from the motor to the clutch shaft, and thereby, with the clamping state of the tool by the clamping mechanism portion being maintained, the rotor shaft can be positioned such that the engagement groove is continuous to the annular groove. As a result, the clutch shaft can move between the engagement groove and the annular groove, and swivel indexing of the plurality of tools mounted on the tool rest can be performed.

Preferably, the decelerating mechanism portion includes an output shaft provided with a groove portion and outputting the rotation to the motion converting mechanism portion. The motion converting mechanism portion includes a rotation input member to which the rotation is input from the output shaft, the rotation input member having a key portion engaging the groove portion. Between the key portion and a groove wall of the groove portion, a gap is provided in a rotation direction of the output shaft.

According to the machine tool configured as described above, the gap is provided between the key portion and the groove wall of the groove portion. Therefore, even when the rotation is input from the motor to the clutch shaft, the range where the clamping mechanism portion is not operated can be formed.

Preferably, assuming that θ represents a rotation angle of the output shaft in a range where the rotation input from the motor to the clutch shaft does not cause the clamping mechanism portion to operate, and R (the number of input rotations/the number of output rotations) represents a reduction ratio of the decelerating mechanism portion, a relationship of θ>180°×1/R is satisfied.

According to the machine tool configured as described above, an input angle from the motor to the clutch shaft when the clamping mechanism portion starts to operate can be set to be equal to or greater than 180°.

Preferably, the machine tool further includes a control portion controlling the rotation of the motor. The control portion controls the rotation of the motor such that an upper limit output of the motor when the clamping mechanism portion is operated is smaller than an upper limit output of the motor when the rotating tool is rotated.

According to the machine tool configured as described above, it is possible to prevent excessive torque from acting on the decelerating mechanism portion when the clamping mechanism portion is operated.

The present invention is applied to the machine tool including the auto tool changing function of the tool mounted on the tool rest.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

What is claimed is:

1. A machine tool comprising:
    a tool turret on which a plurality of tools are mounted;
    a tool holder, which is attached to the tool turret, for detachably holding one of the plurality of tools; and
    a motor provided at the tool turret for rotating the one of the plurality of tools relative to the tool turret when the one of the plurality of tools is held by the tool holder, wherein
    the tool holder has a clamping mechanism portion operating between a clamping state of clamping the one of the plurality of tools and an unclamping state of unclamping the one of the plurality of tools, as a result of transmission of motive power generated at the motor,
    the tool holder further having a clutch shaft to which rotation is input from a rotor shaft of the motor,
    the rotor shaft has an engagement groove which the clutch shaft engages,
    the tool turret has a ring member provided with an annular groove that extends circumferentially with respect to a tool turret indexing axis, and which is continuous to the engagement groove, and
    the clutch shaft is provided so as to be movable between the engagement groove and the annular groove when indexing of the tool turret is performed.

2. The machine tool according to claim 1, wherein
    the tool holder further has a decelerating mechanism portion, which decelerates the rotation input to the clutch shaft, and
    a motion converting mechanism portion, which converts the rotation decelerated by the decelerating mechanism portion into linear motion and transmits the linear motion to the clamping mechanism portion.

3. The machine tool according to claim 2, wherein
    the rotor shaft of the motor outputs the rotation to the decelerating mechanism portion by way of the clutch shaft, and
    the motion converting mechanism portion operates the clamping mechanism portion when the rotation input from the rotor shaft of the motor to the clutch shaft is equal to or greater than 180°.

4. The machine tool according to claim 3, wherein
    the decelerating mechanism portion includes an output shaft with a groove portion, where the output shaft outputs the rotation input thereto to the motion converting mechanism portion,
    the motion converting mechanism portion includes a rotation input member to which the rotation is input from the output shaft, the rotation input member having a key portion engaging the groove portion, and
    between the key portion and a groove wall of the groove portion, a gap is provided in a rotation direction of the output shaft.

5. The machine tool according to claim 3, wherein
    when θ represents a rotation angle of the output shaft in a range where the rotation input from the motor to the clutch shaft does not cause the clamping mechanism portion to operate, and R (the number of input rotations/the number of output rotations) represents a reduction ratio of the decelerating mechanism portion, a relationship of θ>180°×1/R is satisfied.

6. The machine tool according to claim 2, further comprising
    a control portion controlling the rotation of the motor, wherein
    the control portion controls the rotation of the motor such that an upper limit output of the motor when the clamping mechanism portion is operated is smaller than an upper limit output of the motor when the one of the plurality of tools is rotated.

* * * * *